United States Patent
Matsen et al.

(10) Patent No.: US 6,653,608 B1
(45) Date of Patent: Nov. 25, 2003

(54) OXIDATION PROTECTED SUSCEPTOR

(75) Inventors: Marc R. Matsen, Seattle, WA (US); Brad L. Kirkwood, Kent, WA (US); Ronald W. Brown, DesMoines, WA (US)

(73) Assignee: The Boeing Company, Chicago, IL (US)

( * ) Notice: Subject to any disclaimer, the term of this patent is extended or adjusted under 35 U.S.C. 154(b) by 194 days.

(21) Appl. No.: 10/032,625

(22) Filed: Oct. 24, 2001

(51) Int. Cl.⁷ .................................................. H05B 6/06
(52) U.S. Cl. ..................... 219/634; 219/618; 219/659
(58) Field of Search ..................... 219/600, 618, 219/633, 634, 635, 645, 647, 651, 659, 121.66, 121.15, 121.36; 428/608; 427/576, 596; 174/120 R

(56) References Cited

U.S. PATENT DOCUMENTS

| | | |
|---|---|---|
| 3,762,884 A | 10/1973 | Grisaffe et al. |
| 4,263,353 A | 4/1981 | Patel |
| 5,645,744 A | 7/1997 | Matsen et al. |
| 5,728,309 A | 3/1998 | Matsen et al. |
| 5,808,281 A | 9/1998 | Matsen et al. |
| 6,403,889 B1 * | 6/2002 | Mehan et al. ............ 174/120 R |
| 6,528,771 B1 * | 3/2003 | Matsen et al. ............... 219/634 |
| 6,566,635 B1 * | 5/2003 | Matsen et al. ............... 219/633 |
| 2003/0068518 A1 * | 4/2003 | Ando et al. .................. 427/596 |

* cited by examiner

Primary Examiner—Tu Ba Hoang
(74) Attorney, Agent, or Firm—DiPinto & ShimokaJI P.C.

(57) ABSTRACT

A single or multilayer smart susceptor for temperature control of part fabrication in an induction processing system generally consists of single layer or laminated layers of ferromagnetic material susceptible to heating by induction. The use of the susceptors in fabrication at elevated temperatures causes oxidation damage to the surface. The susceptor may be coated with a nickel aluminide surface coating to minimize oxidation of the susceptor outer surface.

16 Claims, 4 Drawing Sheets

OXIDATION PROTECTED SUSCEPTOR

BACKGROUND OF THE INVENTION

This invention relates to single or multilayer smart susceptors used for achieving thermal uniformity in induction processing of organic matrix composites or metals. The improved smart susceptor has a coating to minimize oxidation during repeated use in induction process manufacturing.

An induction processing system used for fabrication of material combines, metals and the like are disclosed in U.S. Pat. Ser. Nos. 5,808,281, 5,728,309, and 5,645,744 and is hereby incorporated by reference. The induction processing system uses susceptors to translate electrical energy to heat energy for fabrication of various parts and structures. The susceptors are often referred to as smart susceptors because the material composition is specifically chosen to produce a set temperature point when used in an induction processing system.

The sheets of material used to construct the susceptor may consist of ferromagnetic materials including a combination of iron (Fe), nickel (Ni), and/or cobalt (Co). For the higher temperature applications the alloys may be Co based with additions of Fe and Ni. Each specific composition and combination of material sheets constructed is based on the Curie temperature characteristics desired of the susceptor. The Curie Point at which there is a transition between the ferromagnetic and paramagnetic phases of a material is used to set the equilibrium temperature point caused by inductive heating in the inductive processing system.

The use of smart susceptor alloys such as combinations of Co, Ni and Fe material in cycling to elevated temperatures in inductive processing systems may cause oxidation of the susceptor material. It has been found that at elevated temperatures these alloys may oxidize at a relatively aggressive rate. In addition, the iron oxide formed may create a low melting point intermetallic interface when positioned in close proximity to the die material at elevated temperature. These conditions may cause the susceptors to deteriorate prematurely requiring replacement thereof. Also, the susceptors may interact with the die material, a ceramic, which necessitates die repair or replacement.

The known approach to reducing the effects of the oxidation of the susceptor has been to insert an intermediate metal sheet of material, such as Inconel 625™, between the susceptor and the die. Material such as Inconel 625™ is a nickel base alloy that is non-magnetic and has oxidation resistive qualities. While this solves the interaction problem, it does not eliminate the oxidation problem and adds additional parts to the system tooling requirements.

One solution to oxidation of the metal surface is the coating thereof. Examples include coating of steel and other materials in internal combustion engines where the high temperature combined with exposure to air create an environment that may be corrosive and cause erosion of metal surfaces. A method of flame or plasma spraying a thin coating layer on the exposed metal surfaces has been used to reduce oxidation damage. Various materials have been used to coat metals and other materials depending on the application. U.S. Pat. No. 3,762,884 discloses one such process as well as surveying other methods. These coatings were not applied to environments such as those for which the present invention is intended nor have coating compositions been formulated to solve the smart susceptor problem.

The coated smart susceptor and method therefore improves the control of superplastic forming, hot forming and/or heat treating processes to achieve a higher quality fabricated part. The coated susceptor use also enables cold loading and unloading of parts that improves dimensional control. The quick thermal cycles with induction processing and the improved life of the susceptor due to the coating reduces the need for batch loading of material as such is no longer required for economic viability of the fabrication processes.

As can be seen, there is a need for a simple, effective protectant to minimize oxidation of susceptors used in induction processing systems.

SUMMARY OF THE INVENTION

An improved susceptor construction and method according to the present invention comprises a metal alloy composition susceptor having a nickel aluminide (NiAl) coating thereon.

In one aspect of the present invention, a susceptor for temperature control of a part fabrication in an induction processing system comprises a single layer or a lamination of layers of ferromagnetic material susceptible to heating by induction, each having a selected Curie point. The single layer or laminated material layers are then coated with a nickel aluminide surface coat for oxidation protection during temperature cycling for part fabrication in the induction processing system. Also, the temperature at which the nickel aluminide may be sprayed to coat a susceptor and any exothermic reaction from the process generates heat creating a sintering effect to bond the coating to the susceptor outer surface.

In another aspect of the invention, the multiplayer susceptor may include an $Al_2O_3$ adherent layer formed on the surface coating to inhibit deterioration of the surface coating. The nickel aluminide coating may create it's own $Al_2O_3$ layer at the surface. This oxide film and the very stable thermally resistant nickel aluminide layer underneath may form an oxidation barrier.

A further aspect of the present invention involves the method for producing a single or multilayer susceptor having a surface coat oxidation protective layer comprising the steps of fabricating a single layer or a plurality of laminated material layers of ferromagnetic material, introducing a wire or powder mixture of nickel and aluminum into a flame or plasma spray gun, operating the spray gun to heat the powder or wire to form droplets and to spray the droplets on an outer surface of the single or laminated material layers, and continuing the spraying to sinter a surface coating of nickel aluminide to the outer surface.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
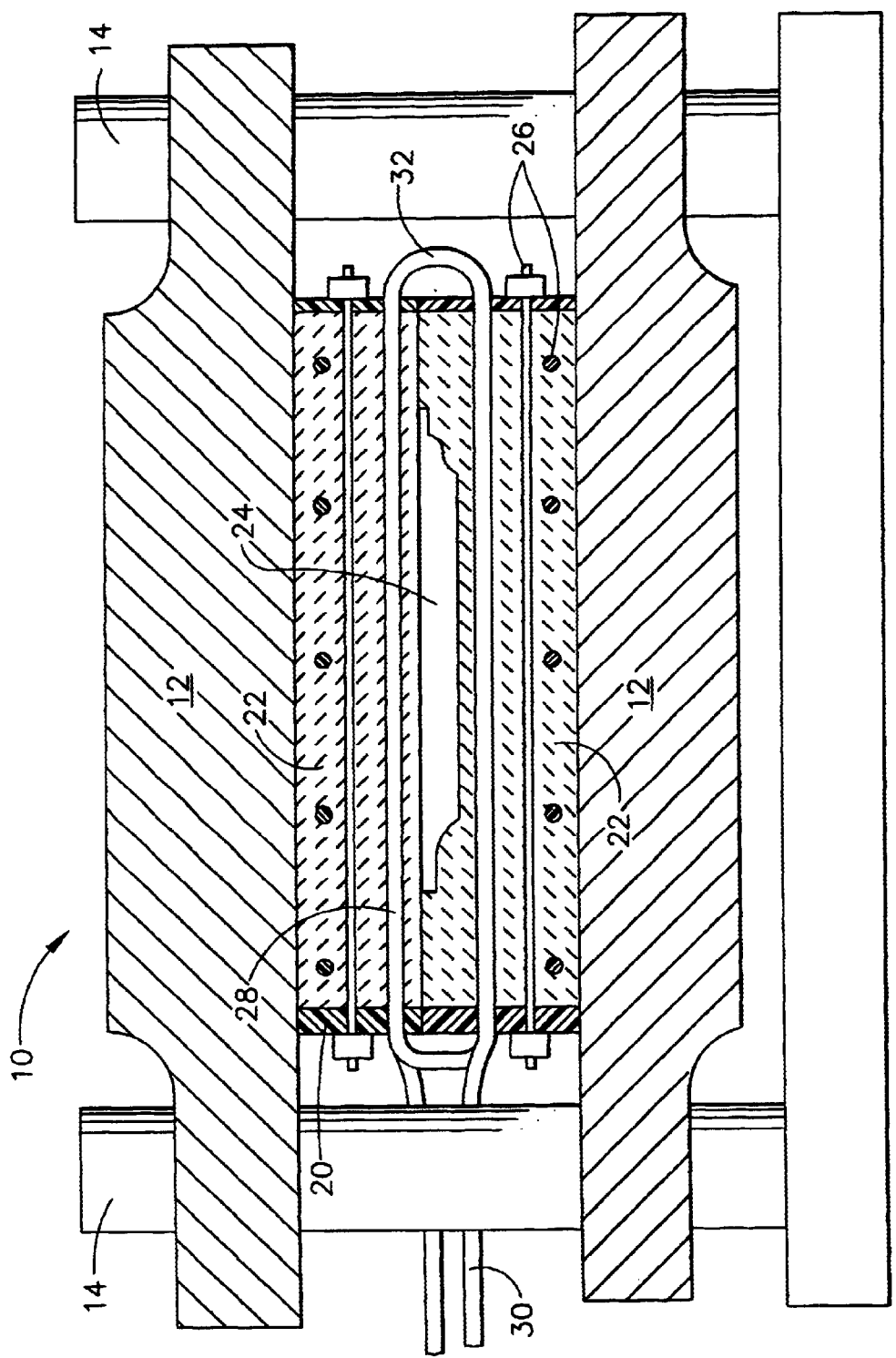
FIG. 1 illustrates a schematic representation of an induction processing system according to the prior art.

Referring to FIG. 1, an induction processing system 10 has metal support plates 12 mounted on support posts 14 that may be used to constrain a tool 20 such as a phenolic box under pressure. The tool 20 includes ceramic die halves 22 which contain the part cavity 24 therebetween. A susceptor (not shown) is mounted in a cavity 24.

The tool 20 includes reinforcing rods 26 for reinforcement of the ceramic dies 22. The tool 20 also incorporates induction coils 28 for heating and coolant conduits 30 for temperature control. Flexible coil connections 32 are provided external to the dies 22 to connect induction coils 28 and coolant conduits 30. In operation, electric power is applied to the induction coils 28 that due to magnetic induction heat the susceptor contained in the part cavity 24.

Figure 2:
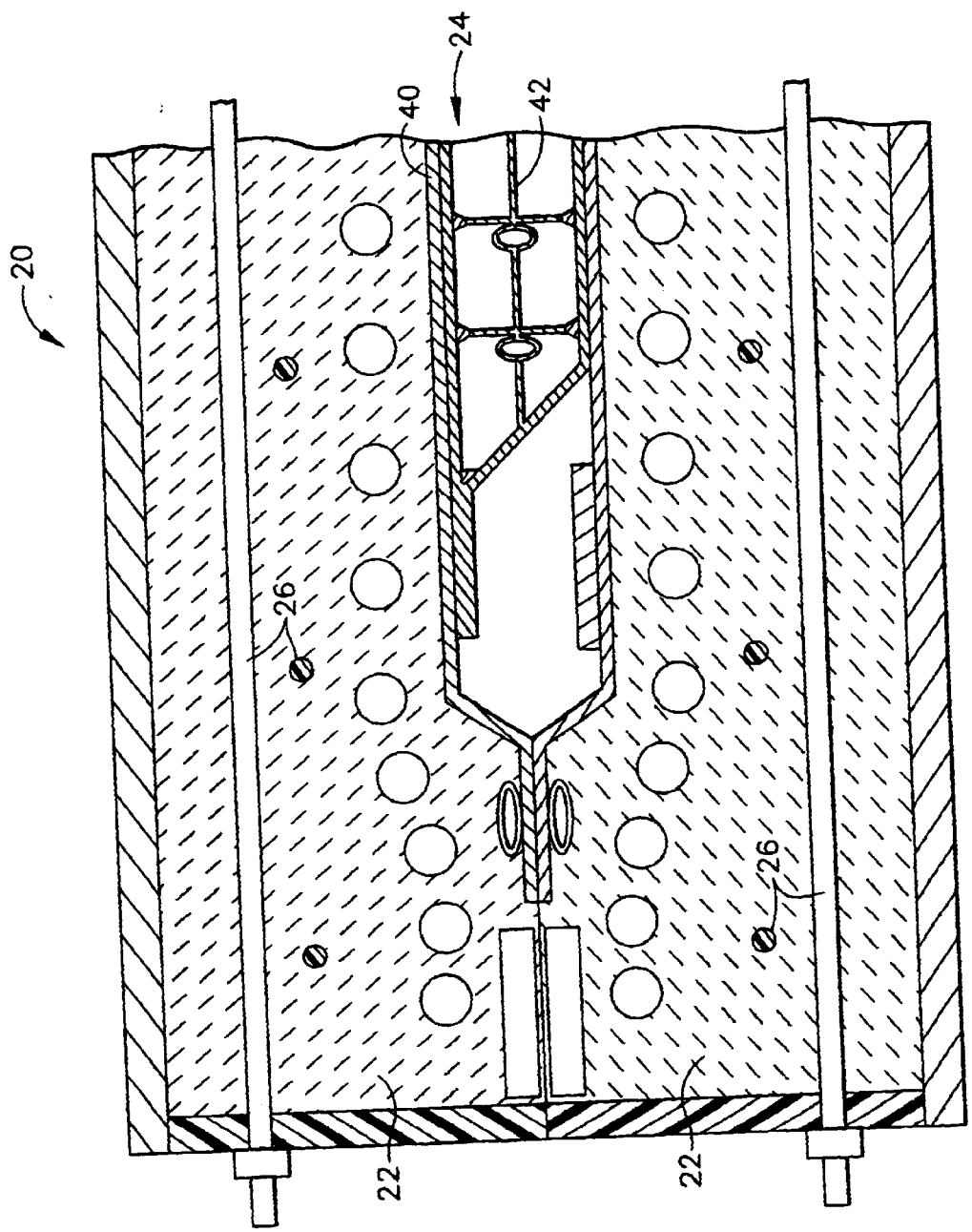
FIG. 2 illustrates a partial cross-sectional view of the tooling with smart susceptor according to the prior art.

Referring to FIG. 2, a portion of the tool 20 with ceramic dies 22 and reinforcing rods 26 includes part cavity 24. A susceptor 40 with a fabrication part 42 may be contained therein. For a particular part 42 manufacture for superplastic forming thereof a relative temperature in the part cavity 24 at the ceramic die 22 inner surface may be 1,650° F. A single layer susceptor 40 may be used when there is just one crucial processing temperature necessary for part fabrication. The susceptor 40 may be coated on all external surfaces.

Figure 3:
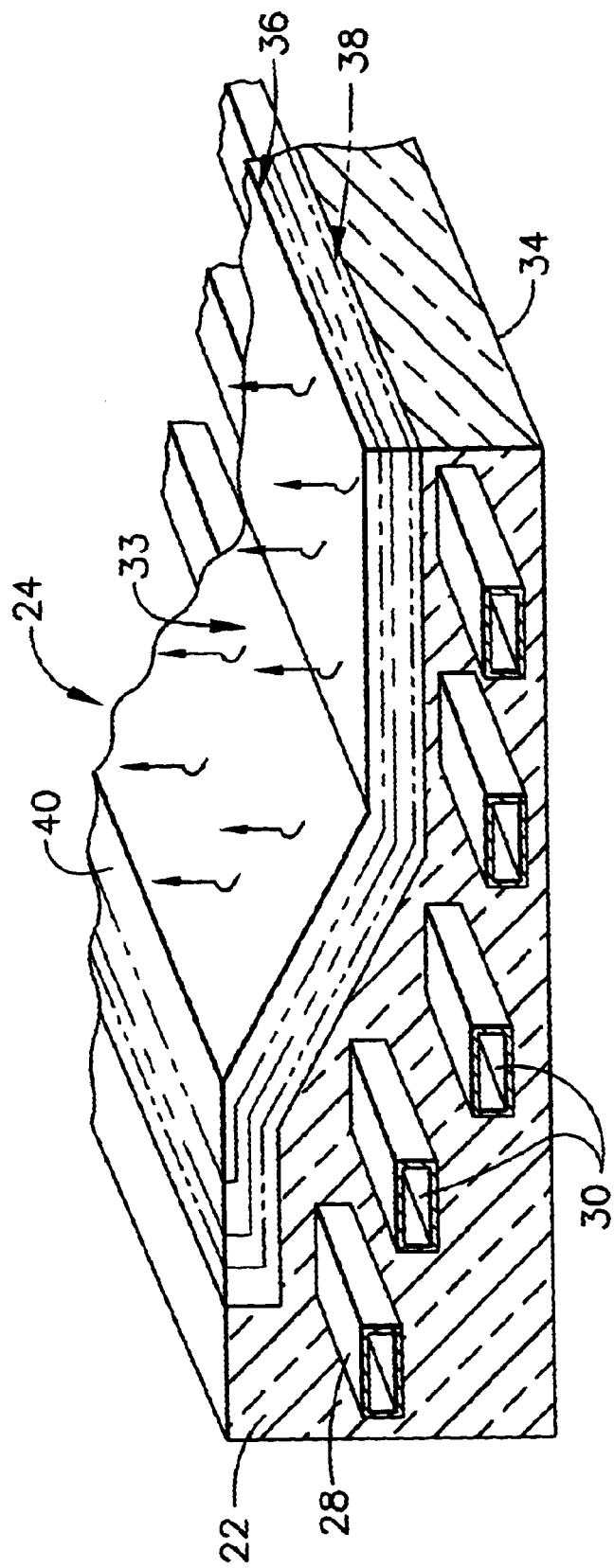
FIG. 3 illustrates a partial perspective view of an induction processing tool with temperature gradients according to the prior art.

Referring to FIG. 3, the ceramic die 22 has electric power applied at induction coil 28. A temperature of 1,650° F. may be desired at the inner surface 36 of the ceramic die 22 in the part cavity 24 for interior point 33 heating of the susceptor (not shown). With the ceramic die 22 characteristics the temperature between the induction coil 28 and the inner surface 36 may be 333° F. at an intermediate point 38. A susceptor may be maintained at the desired Curie Point when sufficient electric power is applied to the induction coils 28 and proper cooling is flowing through coolant conduits 30. The environment point 34 may be room or ambient temperature.

In use, the induction processing system 10 may have material placed in it for heat treatment, forming, consolidation, etc. The system may then be closed and activated to raise and maintain the internal part cavity 24 at the desired temperature. The system may then be cooled and the part removed. This is a cycle process that is repeated for the production of each part.

Figure 4:
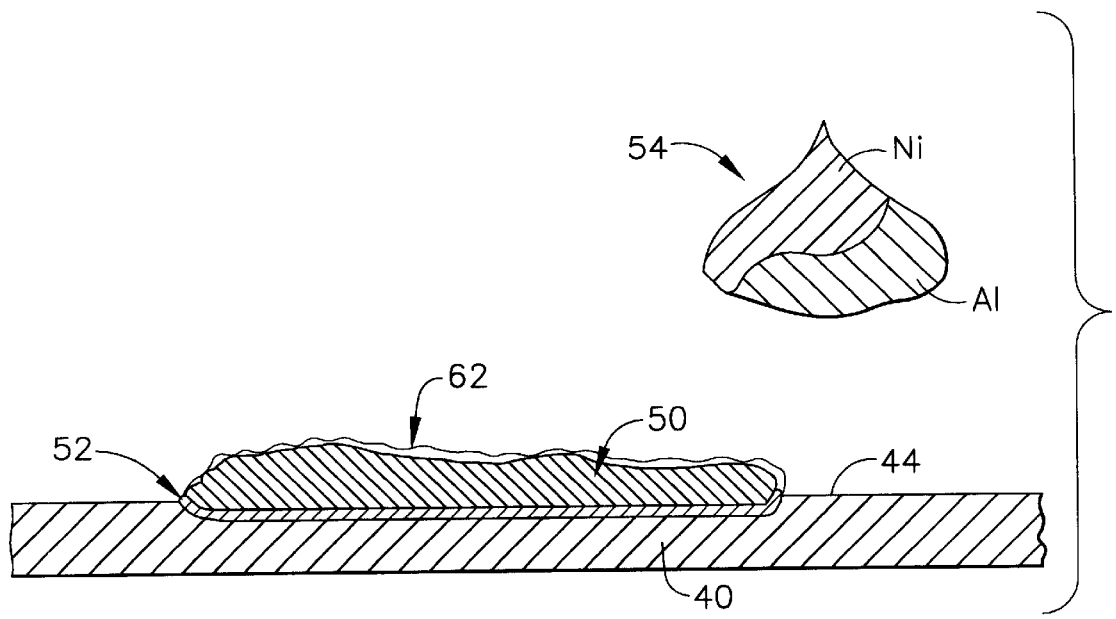
FIG. 4 illustrates a transition diagram of the deposition of nickel aluminide coating of a susceptor according to the present invention.

Referring to FIG. 4, the susceptor 40 may consist of a single or lamination of sheets of highly ferromagnetic materials composed of a combination of Fe, Ni, and/or Co. In higher relative temperature applications the alloys may be Co based with additions of Fe and Ni. The higher the Fe content the more likely the susceptor 40 maintains a set temperature, that is, the smarter it appears.

The Fe and the elevated temperature may combine to form flakes of iron oxide on the susceptor 40 outer surface 44 as a result of the temperature cycling process. It has been found by experiment that coating the susceptor 40 with a nickel aluminide plasma spray coat 50 inhibits oxide formation. The approximate effective coating thickness may be about 0.005 inch to 0.010 inch.

Figure 5:
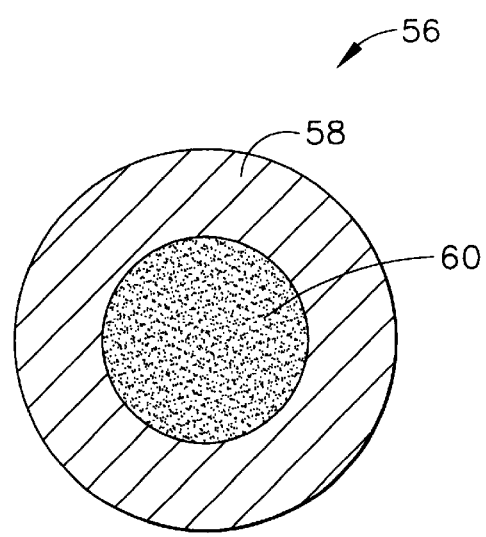
FIG. 5 illustrates a cross-sectional view of an aluminum nickel formed wire for use in a plasma spray gun according to the present invention.

To apply the coating 50, a wire 56 consisting of a nickel powder 60 enclosed in an aluminum foil 58 as illustrated in FIG. 5 may be used in a flame or plasma spray gun. The composition of the wire 56 may be nickel powder of approximately −125 to +45 um (−120 to +325 mesh) range of granularity and represent approximately 79.5 to 80.5 percent of a unit cross section of the wire 56 by weight. The aluminum foil 58 may be approximately 0.010 to 0.015 inch thickness and approximately 19.5 to 20.5 percent of a unit cross section of the wire 56 by weight. A wire 56 that may be ⅛ inch in diameter may define a foil thickness to achieve an approximately 20 percent aluminum content wherein the foil thickness may be related to the diameter and powder density. The use of the flame or plasma spray gun as understood in the art melts the wire 56 and the resulting liquid may be sprayed on the susceptor 40 using a compressed gas.

A powder mixture of nickel and aluminum may also be used for spraying with a flame or plasma spray gun. The powder mixture may also have an approximate ratio of 80 percent nickel and 20 percent aluminum.

During the melting and spraying action the nickel and aluminum are mixed together and begin to react as droplets 54. This may be an exothermic reaction and therefore heat may be generated. When the droplets 54 contact the susceptor 40 they may still be reacting and therefore tend to sinter to the outer surface 44 interface 52 due to the heat created. This combination of actions may result in a strong bond of converted nickel aluminide on the susceptor 40.

It has been found that the nickel aluminde intermetallic is chemically very stable as evidenced by the exothermic reaction occurring during the spray coating. The nickel aluminide coating may form a stable adherent $Al_2O_3$ surface layer 62 when used at the processing temperatures for the susceptor 40. It has been found that after approximately two cycles of use of a coated susceptor 40 in manufacturing that an approximate 0.0002 inch to 0.0008 inch (5 to 20 microns) thick coating of $Al_2O_3$ is formed on the nickel aluminide coating. If the $Al_2O_3$ layer cracks during use, the ductile nickel aluminide coating can reform the oxide layer at elevated temperatures. The result may be a stable and strong oxidation resistant coating on the susceptor 40.

It should be understood, of course, that the foregoing relates to preferred embodiments of the invention and that modifications may be made without departing from the spirit and scope of the invention as set forth in the following claims.

We claim:

1. A susceptor for temperature control of a part fabrication in an induction processing system comprising:
    a layer of ferromagnetic material susceptible to heating by induction and having a selected Curie point; and
    a surface coating of nickel aluminide formed on said layer.

2. The susceptor as in claim 1 wherein said layer is an alloy of at least one of Ni, Fe, and Co.

3. The susceptor as in claim 1 wherein said surface coating is sintered to said layer at an outer surface thereof.

4. The susceptor as in claim 1 wherein said surface coating having an $Al_2O_3$ adherent layer thereon.

5. The susceptor as in claim 1 wherein said surface coating is approximately 0.005 inch to 0.010 inch thick.

6. The susceptor as in claim 4 wherein said $Al_2O_3$ adherent layer average thickness is approximately 5 to 20 microns.

7. A susceptor for temperature control of a part fabrication in an induction processing system comprising:

a layer of ferromagnetic material susceptible to heating by induction and having a selected Curie point;

a surface coating of nickel aluminide sintered to said layer at an outer surface thereof; and an $Al_2O_3$ adherent layer formed on said surface coating.

8. The susceptor as in claim 7 wherein said surface coating is approximately 0.005 inch to 0.010 inch thick.

9. The susceptor as in claim 7 wherein said $Al_2O_3$ adherent layer average thickness is approximately 5 to 20 microns.

10. A susceptor for temperature control of a part fabrication in an induction processing system comprising:

a layer of ferromagnetic material comprised of an alloy of at least one of Ni, Fe and Co;

a surface coating of nickel aluminide sintered to said layer at an outer surface thereof;

an $Al_2O_3$ adherent layer formed on said surface coating;

said surface coating is approximately 0.005 inch to 0.010 inch thick; and said $Al_2O_3$ adherent layer average thickness is approximately 5 to 20 microns.

11. A method for producing single and multilayer susceptors having a surface coat oxidation protective layer, comprising the steps of:

fabricating a layer of ferromagnetic material susceptible to heating by induction and having a selected Curie point;

introducing a nickel and aluminum composition into a spray gun wherein said composition is heated to form droplets of molten nickel and aluminum;

operating the spray gun to spray by force of compressed gas a liquid mixture of heated nickel and aluminum on a surface of said layer; and continuing the spraying to sinter a surface coating of nickel aluminide to said surface.

12. The method as in claim 11 further comprising the steps of:

elevating the temperature of said layer and said protective coating to form an $Al_2O_3$ adherent layer on said surface coating.

13. The method as in claim 11 wherein said surface coating is approximately 0.005 inch to 0.010 inch thick.

14. The method as in claim 12 wherein said $Al_2O_3$ adherent layer average thickness is approximately 5 to 20 microns.

15. The method as in claim 11 wherein said nickel and aluminum composition is a wire comprised of a nickel powder enclosed in an aluminum foil, wherein said nickel powder having a granularity of approximately −125 to +45 um, −120 to +325 mesh, and is approximately 80 percent by weight of a unit cross section of said wire, and said aluminum foil having a thickness such that aluminum is approximately 20 percent by weight of a unit cross section of said wire.

16. The method as in claim 11 wherein said nickel and aluminum composition is a powder mixture comprised of a nickel powder of approximately 80 percent by weight and an aluminum powder of approximately 20 percent by weight.

* * * * *